United States Patent [19]

Camprincoli et al.

[11] Patent Number: 4,544,606
[45] Date of Patent: Oct. 1, 1985

[54] FIBRILLED POLYMERIC FILMS AS REINFORCEMENT IN MANUFACTURED PRODUCTS BASED ON HYDRAULIC BINDERS

[75] Inventors: Pierpaolo Camprincoli, Terni; Enzo Marcaccioli, Perugia; Luciano Rosati, Stroncone, all of Italy

[73] Assignee: Montedison S.p.A., Milan, Italy

[21] Appl. No.: 341,786

[22] Filed: Jan. 22, 1982

Related U.S. Application Data

[63] Continuation of Ser. No. 195,937, Oct. 10, 1980, abandoned.

[30] Foreign Application Priority Data

Oct. 12, 1979 [IT]   Italy ................................ 26463 A/79

[51] Int. Cl.⁴ ........................... B32B 5/16; B29H 9/02
[52] U.S. Cl. .................................... 428/454; 428/240; 428/241; 428/255; 428/325; 428/523
[58] Field of Search ............... 428/523, 323, 325, 255, 428/240, 241, 454; 264/147, 211; 106/99

[56] References Cited

U.S. PATENT DOCUMENTS 3,746,607  7/1973  Harmon et al. .
3,865,779  2/1975  Oya et al. .
4,129,632  12/1978  Olson .

FOREIGN PATENT DOCUMENTS 48721  5/1974  Japan .
54-99132  4/1979  Japan .
1073741  6/1967  United Kingdom .
1316661  5/1973  United Kingdom .
2034243  6/1980  United Kingdom ................ 264/147

*Primary Examiner*—Lorraine T. Kendell

[57] ABSTRACT

Fibrilled polyolefinic films, of a net-like structure, containing, incorporated therein, from 1% to 20% by weight of a cement-based material, are used as a reinforcement in the preparation of manufactured products based on hydraulic binders. A process for preparing the fibrilled films and hydraulic binder-based manufactured products comprising them are also disclosed.

8 Claims, No Drawings ature.
FIBRILLED POLYMERIC FILMS AS REINFORCEMENT IN MANUFACTURED PRODUCTS BASED ON HYDRAULIC BINDERS This is a continuation of U.S. Patent application Ser. No. 195,937, filed Oct. 10, 1980, and now abandoned.

BACKGROUND OF THE INVENTION

It is known from British Pat. No. 1,037,741, to prepare flat or tubular net-shaped structures consisting of longitudinally oriented interlaced synthetic polymers, by producing, with the help of suitable cutting devices, a series of spaced, parallel slots in either a flat or tubular, mono-oriented polymer film, so that the successive transversal expansion of the slitted film will produce the net-like structure.

Net-shaped structures of an analogous type, although consisting of filaments interlaced in a much more irregular and casual manner, may be obtained, furthermore, by disaggregation or by slitting of the mono-oriented polymeric films by different methods, such as, for instance, by sandblasting, brushing or rubbing.

In general, the products thus obtained are bulky and flexible, and are used for manufacturing ropes, cords and strings and textile materials of various kinds.

It is also known, from Spanish Pat. No. 460,292 corresponding to U.S. Pat. No. 4,297,409, to use structures of that kind, opened by transversal or cross-expansion, in manufactured products based on inorganic hydraulic binders, in order to obtain an improvement of their mechanical characteristics.

Given the chemical incompatibility of the synthetic polymers in general for the inorganic materials that form the hydraulic binders, the polymeric structures thus used hardly adhere to the matrix of the binder, wherefore the reinforcing action is not altogether effective.

In British Pat. No. 1,316,661, there is described a process aimed at improving the characteristics of the manufactured products made of hydraulic binders, by means of a reinforcement with synthetic polymeric fibers additioned with 20-80% of cements. In such a case the fibers are of the traditional type with a high count (greater than 50 denier), and are cut into 50-30 mm long staples.

Similar fibrous compositions, to be used as reinforcement of manufactured products from hydraulic binders, are also claimed in published Japanese patent application No. 74/48.721.

The use of this kind of reinforcement caused problems in the production of the fibers with regard to the high percentage of additive present, and does not allow to obtain manufactured products from hydraulic binders that will have satisfactory characteristics. More particularly, the resistance to bending of the reinforced manufactured products is only slightly higher than that of the non-reinforced products.

Finally, there has been disclosed fibrillated films of synthetic polymer materials, suited for use as reinforcement for hydraulic binders which contain from 1% to 30% by weight of zirconium compounds, particularly zirconium and zirconyl halides, zirconium and zirconyl silicates, alkaline and alkaline-earth metal zirconates and halozirconates.

THE PRESENT INVENTION

One object of this invention is to provide fibrillated films or flat net-like structures of synthetic polymers having incorporated therein from 1% to 20% by weight of at least one cement-based material.

Preferably, the cement-based material is contained in the fibrillated film in amounts ranging from 3% to 18%, and even more preferably from 5% to 15% by weight.

A further object of this invention is to provide a process for the preparation of such films or structures. Still another object of the invention is that of providing manufactured products of cement or other inorganic hydraulic binders having incorporated therein such films or structures.

Preferably, the fibrillated films or flat net-shaped structures according to this invention, show a specific surface area of at least 0.2 $mt^2/g$, and more preferably comprised between 0.25 and 1.3 $mt^2/g$.

These and other objects are achieved by the present invention in accordance with which the mechanical characteristics of the manufactured products based on inorganic hydraulic binders are considerably improved by using, as a reinforcement, net-like structures of the above described type, containing quantities of between 1% and 20%, and preferably between 3% and 18% by weight of a cement-based material as defined herein below.

The net-like structure can be formed of any orientable, film-forming synthetic polymer, among which may be cited, as examples: polyolefins, polyamides, vinyl polymers, polyester resins, and mixtures of such polymers, and in particular the olefinic polymers prepared with stereospecific catalysts such as, for instance, polypropylene prevailingly formed of isotactic macromolecules, polyethylene, the crystalline ethylene-propylene copolymers with a predominating content of propylene, both of the random as well as of the block type, or mixtures thereof.

Particularly convenient for the preparation of structures according to this invention are the polypropylene blends with up to 20% by weight, on the blend with the polypropylene, of polyethylene of the low-density type, and/or of ethylene-propylene copolymers.

In the expression "cement-based material" as used herein are comprised all the inorganic powdery materials that are usually present or that may be used in the composition of hydraulic binders, and in particular hydraulic or water limes, pozzolanic cements, Portland cements, metallurgical cement, aluminous cements, diatomites or fossil meals, sands and silicon materials in general, as well as blends or mixtures of such products.

As diatomites, there may be used those containing at least 50% by weight of silica. The diatomites known commercially as "Celite" are particularly convenient.

One preferred method for preparing the structures according to this invention consists of the following operations, in the given order:

(a) preparation of a mix or blend of at least one film-forming and orientable synthetic polymer, with 1–20% by weight, on that mix, of a powdery cement-based material, and, optionally, with 0.05–0.5% by weight of an expanding blowing agent;

(b) transformation of the mix or blend into a flat or tubular film;

(c) orientation of this film in a longitudinal or prevailingly longitudinal direction, by mechanical stretching, with stretch ratios comprised between 1:3 and 1:15, with the formation of an oriented film having a thickness comprised between 20 and 200 microns; and (d) fibrillation of the oriented film.

Examples of expanding or swelling agents which can be present in the mix or blend of (a) are: azo-dicarbonamide, azo-bis-isobutyrronitrile, di-nitrous-pentamethylenetetramine, sodium bicarbonate and the like.

The preparation of the film from the mix of polymer and cement-based materials may be carried out according to known procedures or methods, such as, for instance, by extrusion or by casting.

The film-orienting operation (c) may be achieved by hot-stretching between sets of slow- and fast-revolving rollers. The fibrillation of the oriented film is achieved by means of slitting, which is preferably carried out by allowing the film to pass over surfaces fitted with slitting elements such as blades, pins or needles, and the like, according to the techniques described in British Pat. No. 1,073,741.

Values of specific surface area of at least 0.2 mt$^2$/g may be attained by such a slitting operation, and preferably by subjecting the film, before the slitting, to additional treatments such as, for instance, superficial abrasion with brushes, sandblasting and the like.

In this connection, some techniques have been described, for instance, in the U.S. application of Andrea Vittone et al., Ser. No. 150,709 filed May 19, 1980.

Once the fibrillated films or the net-like structures of this invention have been obtained, they may be made wettable by superficial oxidative treatments such as, for instance, the known treatments by flame or those by high frequency electrical discharges, and moreover they may be dimensionally stabilized.

The fibrillated or net-like structured films of this invention, may be in the form of either single elements or in the form of packages of a plurality of superimposed fibrillated films, one above the other, variously arranged whereby the single films are free with respect to each other or are welded to each other.

Such structures may be used as reinforcement in all types of inorganic hydraulic binders, such as for instance, Portland cements, aluminous cements, hydraulic limes, gypsum.

Variations and changes in details may be introduced in the practice of this invention without departing from the spirit and scope thereof.

The following examples are given as illustrative and are not intended to be limiting.

EXAMPLE 1

A mix or blend was prepared by mixing together, in a 100 lt Battagion type mixer:

| | |
|---|---|
| polypropylene in flakes (melt index = 10; ashes = 75 ppm; residue of heptane extraction: 97.5%) | 35 kg. |
| low-density polyethylene | 3 kg. |
| Portland 425 cement | 2 kg. |

This mix or blend was then granulated at 210° C. and the ensuing granulate was extruded as a flat film. The film thus obtained was stretched in a longitudinal direction, with a stretch ratio of 1:8.5, at a temperature of 130° C. The stretched film was 60 microns thick.

The mono-stretched film was thereupon slit by passing it over a fibrillating needle roller to obtain a fibrillated film which had a specific superficial area of 0.25 mt$^2$/g determined by absorption of gaseous krypton.

The net-like structure thus formed was opened to an opening ratio of 1:9, and the open reticular structure was dimensionally stabilized by heat treatment at 120° C. for five minutes.

There were then prepared composite plates, by alternating layers of said reticular structures or nets to layers of Portland 325 cement mixed with water in a weight of water/cement ratio equal to 0.35:1, using 120 nets (with a net/cement volume ratio of 9:91), thereupon allowing said plates to rest for 24 hours, and then allowing them to age or ripen for 28 days at 25° C.

The three-points bending stress resistance, on test pieces cut off from said plates in the direction of orientation of the films, was determined according to UNI-3948 standards, and amounted to 305 kg/cm$^2$.

Composite plates, prepared in a similar way, but using 60 instead of 120 nets, with a volumetric ratio net/cement of 5:95, showed a three-points bending stress resistance equal to 280 kg/cm$^2$.

On the contrary, a comparative plate, prepared by using fibers of 50 dtex, obtained from the same blend, and with a volumetric ratio, fiber/cement equal to 5:95, displayed a three-points flexing resistance of 110 kg/cm$^2$.

EXAMPLE 2

Operation was as in Example 1, except that the starting mix or blend contained 34.2 kg of polypropylene and 2.8 kg of Portland 425 cement, besides 3 kg of low-density polyethylene and that the fibrillated film showed a specific surface area of 0.3 mt$^2$/g.

The three-points bending stress resistance, taken on test pieces cut off from the said composite plates in the direction of orientation of the film, according to UNI-3848 standards, was 320 kg/cm$^2$.

EXAMPLE 3

Proceeding as in Example 1, but with a starting blend consisting of 33.4 kg of polypropylene, 3 kg of low-density polyethylene and 3.6 kg of Portland 425 cement, the fibrillated film obtained had a specific surface area of 0.42 m$^2$/g. The three-points bending stress resistance test was carried out on test pieces cut off the composite plates in the direction of the orientation of the film, according to UNI-3948 standards, and proved to be equal to 325 kg/cm$^2$.

EXAMPLE 4

A blend was prepared by mixing together in a 100 lt Battagion mixer:

| | |
|---|---|
| polypropylene in flakes (melt index = 10; ashes = 75 ppm; residue of heptane extraction = 97.5%) | 35 kg. |
| low-density polyethylene | 3 kg. |
| hydraulic lime | 2 kg. |
| azo-dicarbonamide (blowing agent) | 0.1 kg. |

This blend was extruded to a flat film, which was stretched in a longitudinal direction with a stretching ratio of 1:9; at a temperature of 130° C. The thickness of the film was 60 microns.

The mono-stretched film was slit by passing it over a fibrillating needle-roller to obtain a fibrillated film that had a specific surface area of 0.45 mt$^2$/g, determined by absorption of gaseous krypton.

The net-like structure thus formed was then opened with an opening ratio equal to 1:9; and the open reticular structure was dimensionally stabilized by thermal treatment at 125° C., for 5 minutes.

On the composite plates, obtained by alternating layers of reticular structures with layers of Portland 325 cement, mixed with water in a ponderal ratio, water/cement, of 0.3/1, by using 120 reticular structures (with a volumetric ratio, reticular structure/cement, equal to 9:91), allowing the blend to rest for 24 hours and by then allowing it to set for 20 days at 25° C., the three-points bending stress resistance, taken on test pieces cut off in the direction of orientation of the film, according to UNI-3948 standards, was 350 kg/cm$^2$.

EXAMPLE 5

A blend was prepared by mixing together in a 100 lt Battagion mixer:

| | |
|---|---|
| polypropylene in flakes (melt index = 12; ashes = 75 ppm; residue of heptane extraction = 97.5%) | 34.8 kg. |
| low density polyethylene | 3.2 kg. |
| "Celite" (*) diatomite | 2.0 kg. |

(*) "Celite" of the "Superfine Superfloss" type having an apparent density of about 0.2 g/cm$^3$, and the following percent by weight composition:

| | | | |
|---|---|---|---|
| silica | 91.9% b.w. | titanium oxide | 0.3 |
| alumina | 3.3% b.w. | calcium oxide | 0.5 |
| iron oxide | 1.3% b.w. | magnesium oxide | 0.5 |
| alkali | 2.0% b.w. | | |

From this blend, operating as in Example 1, a fibrillated film was prepared having a specific surface area 0.33 m$^2$/g which film, after opening with an opening ratio of 1:9 and after a dimensional stabilization, was used for preparing composite cement plates.

The cement plates were obtained by alternating layers of reticular structures with Portland 325 cement mixed with water in a ponderal ratio, water/cement, equal to 0.3:1, by using 130 reticular structures (volumetric ratio, reticular structure/cement, equal to 8:92), allowing the plates to rest for 24 hours and by then allowing the assembly to ripen for 28 days at 25° C.

The three-points bending stress resistance of the plates, measured on the test pieces cut off in the direction of orientation of the film, according to UNI-3948 standards, amounted to 300 kg/cm$^2$.

Composite plates prepared in a similar way, but containing 60 nets instead of 120 nets, with a volumetric ratio nets/cement, equal to 5:95, showed a three-points bending stress resistance of 270 kg/cm$^2$. On the other hand, comparative plates, prepared by using as reinforcement 2,8 dtex fibers obtained from the same mix or blend, with a volumetric ratio, fibers/cement, of 5:95 showed a three-point bending stress resistance of 118 kg/cm$^2$.

EXAMPLE 6

Example 5 was repeated, except that the blend consisted of 32.8 kg of polypropylene, 3.2 kg of low-density polyethylene and 4.0 kg of the same "Celite", and that the fibrillated film had a specific surface area of 0.4 mt$^2$/g.

The three-points bending stress resistance of the composite cement plates, prepared by using the net-like structures of this Example, and following the same procedures as those of Example 5, measured on test pieces cut off along the direction of orientation of the film, was equal to 350 kg/cm$^2$.

EXAMPLE 7

Example 5 was repeated, except that the starting blend consisted of 30.8 kg of polypropylene, 3.2 kg of low-density polyethylene and 6.0 kg of the same "Celite", and that the fibrillated film has a specific surface of 0.45 mt$^2$/g.

In this case, the three-points bending stress resistance of the plates, measured on test pieces cut off along the direction of orientation of the film, according to UNI-3948 standards, was 360 kg/cm$^2$.

EXAMPLE 8

Example 5 was repeated, except that the starting blend contained also 0.04 kg of azo-dicarbonamide as an expanding or blowing agent, and that the fibrillated film thus obtained displayed a specific surface area of 0.51 mt$^2$/g.

In this Example, the three-points bending stress resistance carried out according to UNI-3948 standards, on test pieces cut off along the line of orientation of the film, proved to be 350 kg/cm$^2$.

EXAMPLE 9 (comparative)

A blend was prepared by mixing together, in a 100 lt Battagion mixer:

| | |
|---|---|
| polypropylene in flakes (melt index = 12; ashes = 75 ppm; residue of heptane extraction: 95.5%) | 36.8 kg. |
| low density polyethylene | 3.2 kg. |

This blend was then granulated at 210° C. and the granules were extruded to form a flat film, which was stretched in a longitudinal direction with a stretching ratio equal to 1:8.5, at a temperature of 130° C. The thickness of the stetched film amounted to 60 microns.

This mono-stretched film was then slit by passing it over a fibrillating needle-roller. Thereby was obtained a fibrillated film which had a specific surface area of 0.18 mt$^2$/g, determined by absorption of gaseous krypton.

The net-like structure thus formed, was opened with an opening ratio of 1:9. The opened reticular structure was dimensionally stabilized by means of a heat treatment at 125° C. for 5 minutes.

In composite plates obtained by alternating layers of reticular structures with layers of Portland 325 cement mixed with water in a ponderal ratio, water/cement, of 0.3:1, and by using 130 reticular structures (volumetric ratio, reticular structure/cement=8.92), and by allowing the composite plates to rest for 24 hours and then ripen for 28 days at 25° C., the three-points flexing resistance measured on test pieces cut off along the line of orientation of the film, according to UNI-3948 standards, was found to amount to 225 kg/cm$^2$.

We claim:

1. Reinforcement for manufactured products based on hydraulic binders, said reinforcement consisting of a fibrillated film or flat net-shaped structure made of at least one polyolefin selected from the group consisting of polyethylene and polypropylene, and characterized in having, incorporated therein, from 3 to 18% by weight of at least one cement-based material and in having a specific surface area in the range 0.25 to 1.3 m$^2$/g.

2. A film or flat net-shaped structure according to claim 1, in which the synthetic polymer is polypropylene.

3. A film or flat net-shaped structure according to claim 1, in which the synthetic polymer consists of a mix or blend of polypropylene with up to 20% by weight of low-density polyethylene.

4. A film or flat net-shaped structure according to claims 1, 2 or 3, having a surface area of at least 0.2 m²/g.

5. A film or flat net-shaped structure according to claims 1, 2 or 3, in which the cement-based material consists of at least one material usable in hydraulic binder compositions.

6. A film or flat net-shaped structure according to claim 1, in which the cement-based material is Portland cement.

7. A film or flat net-shaped structure according to claim 1, in which the cement-based material is diatomite.

8. Composite plates consisting of layers of a fibrillated or net-like structure according to claim 1 alternating with layers of cement.

* * * * *